(12) United States Patent
Kakishima et al.

(10) Patent No.: US 11,791,870 B2
(45) Date of Patent: Oct. 17, 2023

(54) RADIO COMMUNICATION SYSTEM AND RADIO BASE STATION APPARATUS

(71) Applicant: NTT DOCOMO, INC., Tokyo (JP)

(72) Inventors: Yuichi Kakishima, Tokyo (JP); Satoshi Nagata, Tokyo (JP); Yoshihisa Kishiyama, Tokyo (JP); Anass Benjebbour, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 58 days.

(21) Appl. No.: 14/779,441

(22) PCT Filed: Feb. 28, 2014

(86) PCT No.: PCT/JP2014/055087
§ 371 (c)(1),
(2) Date: Sep. 23, 2015

(87) PCT Pub. No.: WO2014/156469
PCT Pub. Date: Oct. 2, 2014

(65) Prior Publication Data
US 2016/0056871 A1 Feb. 25, 2016

(30) Foreign Application Priority Data
Mar. 29, 2013 (JP) .................................. 2013-074455

(51) Int. Cl.
*H04B 7/04* (2017.01)
*H04W 72/04* (2023.01)
(Continued)

(52) U.S. Cl.
CPC ........... *H04B 7/0456* (2013.01); *H04B 7/024* (2013.01); *H04B 7/0413* (2013.01);
(Continued)

(58) Field of Classification Search
CPC .... H04B 7/0456; H04B 7/0617; H04B 7/024; H04B 7/0413; H04B 7/0619; H04B 7/0634; H04W 72/0446; Y02D 30/70
See application file for complete search history.

(56) References Cited

U.S. PATENT DOCUMENTS

| 2001/0004604 A1 | 6/2001 | Toshimitsu et al. |
| 2009/0034636 A1* | 2/2009 | Kotecha .............. H04L 43/0864 375/260 |

(Continued)

FOREIGN PATENT DOCUMENTS

| EP | 2343942 A1 | 7/2011 |
| JP | H09-232848 | 9/1997 |

(Continued)

OTHER PUBLICATIONS

Office Action issued in the counterpart European Patent Application No. 14773043.6, dated Jul. 18, 2016 (13 pages).

(Continued)

*Primary Examiner* — Will W Lin
(74) *Attorney, Agent, or Firm* — Osha Bergman Watanabe & Burton LLP

(57) ABSTRACT

A radio communication system includes a first radio base station having multiple antenna elements, and user equipment, wherein, for initial connection of the user equipment to the first radio base station, the first radio base station applies different precoding vectors to a downlink user common signal transmitted to all users located in or near a serving area of the first radio base station, and transmits the downlink user common signal while changing the applied precoding vector; wherein the user equipment selects a desired one of the precoding vectors applied to the downlink user common signal, and reports a selection result to the first radio base station, and wherein the first radio base station precodes a data signal addressed to the user equipment using (Continued)

the selected precoding vector and transmits the precoded data signal to the user equipment.

7 Claims, 8 Drawing Sheets

(51) Int. Cl.
*H04B 7/06* (2006.01)
*H04B 7/0456* (2017.01)
*H04B 7/0413* (2017.01)
*H04B 7/024* (2017.01)
*H04W 72/0446* (2023.01)

(52) U.S. Cl.
CPC ......... *H04B 7/0617* (2013.01); *H04B 7/0619* (2013.01); *H04B 7/0634* (2013.01); *H04W 72/0446* (2013.01); *Y02D 30/70* (2020.08)

(56) References Cited

U.S. PATENT DOCUMENTS

| | | | | |
|---|---|---|---|---|
| 2010/0061482 | A1* | 3/2010 | Lee | H04B 7/0671 375/296 |
| 2010/0075705 | A1 | 3/2010 | van Rensburg et al. | |
| 2010/0189002 | A1* | 7/2010 | Choi | H04B 7/0617 370/252 |
| 2011/0211595 | A1* | 9/2011 | Geirhofer | H04B 7/155 370/478 |
| 2011/0268101 | A1* | 11/2011 | Wang | H04W 56/002 370/344 |
| 2011/0269449 | A1 | 11/2011 | Kazmi et al. | |
| 2011/0317780 | A1* | 12/2011 | Kang | H04L 5/0053 375/259 |
| 2012/0114064 | A1* | 5/2012 | Kotecha | H04B 7/0417 375/295 |
| 2013/0039345 | A1* | 2/2013 | Kim | H04W 72/0413 370/332 |
| 2013/0230081 | A1* | 9/2013 | Wernersson | H04B 7/0617 375/267 |
| 2013/0281076 | A1* | 10/2013 | Damnjanovic | H04W 48/17 455/418 |
| 2013/0294317 | A1* | 11/2013 | Malladi | H04W 4/06 370/312 |
| 2013/0343215 | A1* | 12/2013 | Li | H04B 7/0452 370/252 |
| 2014/0056220 | A1* | 2/2014 | Poitau | H04W 40/246 370/328 |
| 2014/0177751 | A1* | 6/2014 | Tomeba | H04B 7/0456 375/295 |
| 2014/0198744 | A1* | 7/2014 | Wang | H04B 7/0617 370/329 |
| 2014/0247808 | A1* | 9/2014 | Zhang | H04L 27/2655 370/328 |
| 2015/0016379 | A1* | 1/2015 | Nam | H04B 7/0482 370/329 |
| 2015/0078222 | A1* | 3/2015 | Yang | H04W 72/1257 370/280 |
| 2015/0162966 | A1* | 6/2015 | Kim | H04B 17/00 370/252 |
| 2015/0318908 | A1* | 11/2015 | Ko | H04L 1/00 375/267 |
| 2015/0373736 | A1* | 12/2015 | Ji | H04L 5/0048 370/330 |

FOREIGN PATENT DOCUMENTS

| | | |
|---|---|---|
| JP | 2001177864 A | 6/2001 |
| JP | 2010157805 A | 7/2010 |
| JP | 2010171648 A | 8/2010 |
| JP | 2012-165476 A | 8/2012 |
| JP | 2013-38586 A | 2/2013 |
| WO | 2012083500 A1 | 6/2012 |
| WO | 2013/008406 A1 | 1/2013 |
| WO | 2013/024852 A1 | 2/2013 |
| WO | WO 2013042922 A2 * | 3/2013 ........... H04B 7/0408 |

OTHER PUBLICATIONS

Extended Search Report issued in the counterpart European Patent Application No. 14773043.6, dated Jul. 18, 2016 (13 pages).
Extended European Search Report issued in corresponding European Application No. 14773043.6, dated Mar. 22, 2016 (7 pages).
International Search Report issued in corresponding application No. PCT/JP2014/055087 dated Jun. 3, 2014 (4 pages).
3GPP TSG RAN#58, RP-121994, "Study on Downlink Enhancements for Elevation Beamforming for LTE." (5 pages).
Samsung, "New SID Proposal: Study on Full Dimension MIMO for LTE"; 3GPP TSG RAN Meeting #58, RP-122015 Barcelona, Spain, Dec. 4-7, 2012 (6 pages) (document marked as RP-121804).
Japanese Office Action of Japanese Application No. 2013-074455 dated Nov. 25, 2014 with partial English translation thereof (6 pages).
Extended European Search Report issued in the counterpart European Patent Application No. 16206206.1, dated Apr. 19, 2017 (8 pages).
Office Action issued in corresponding Japanese Application No. 2015-010025, dated Mar. 7, 2017 (7 pages).
Office Action issued in corresponding Japanese Patent Application No. 2015-010025, dated Nov. 7, 2017 (5 pages).
Decision to Refuse issued in the counterpart European Patent Application No. 14773043.6, dated Jun. 12, 2019 (41 pages).
Summons to attend oral proceedings pursuant to Rule 115(1) EPC issued in corresponding European Application No. 14773043.6, dated Dec. 12, 2018 (7 pages).

* cited by examiner

FIG.3
(A) 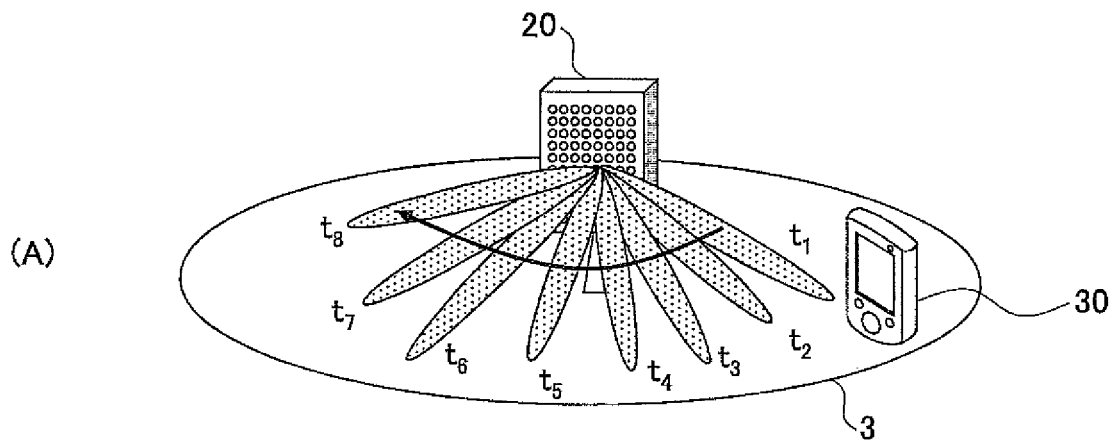
(B) 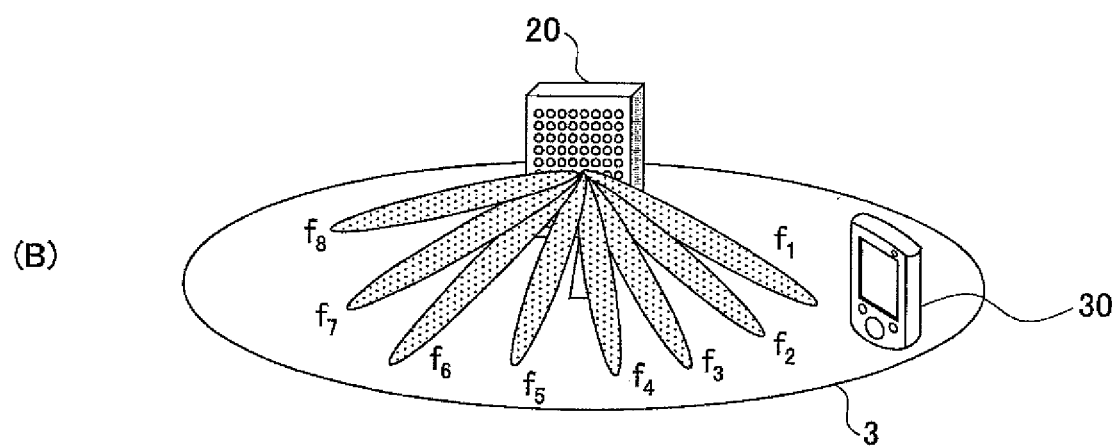
(C) 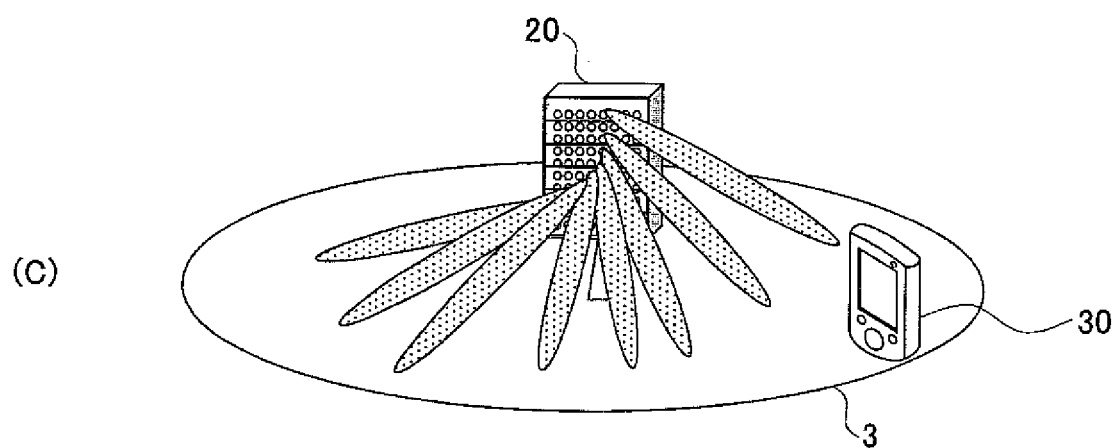

FIG.4
(A)
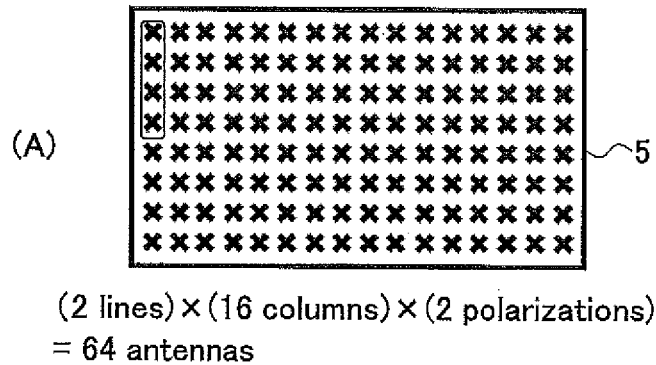
(2 lines) × (16 columns) × (2 polarizations)
= 64 antennas
(B)
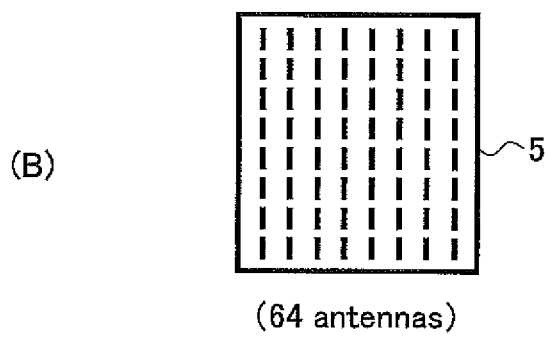
(64 antennas)
(C)
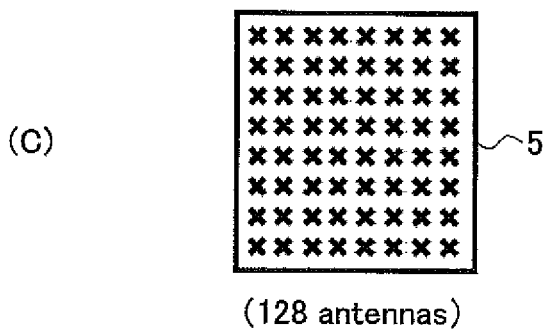
(128 antennas)
(D)
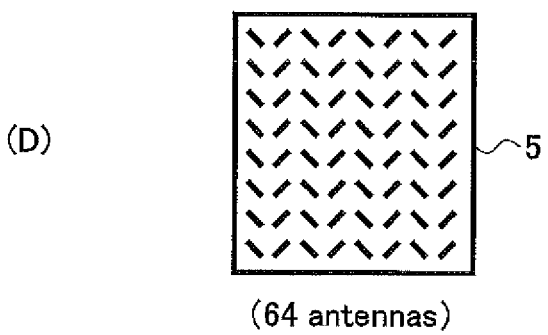
(64 antennas)

RADIO COMMUNICATION SYSTEM AND RADIO BASE STATION APPARATUS

TECHNICAL FIELD

The present invention relates to a radio communication technology, and more particularly, to a three-dimensional multiple input, multiple output (3D-MIMO) radio communication system and a radio base station apparatus.

BACKGROUND ART

Long term evolution standardization in Third Generation Partnership Project (which may be referred to as "3GPP LTE") Release 8 to Release 11 have adopted horizontal beamforming using linear array antenna elements arranged in the horizontal dimension.

In 3GPP LTE Release 12 and beyond, a 3D-MIMO beamforming scheme that takes vertical beamforming into account, in addition to horizontal beamforming, is being discussed. The 3D-MIMO beamforming is implemented by providing a number of antenna elements arranged in the horizontal and vertical dimensions to a base station. See, for example, non-Patent documents listed below. By forming beams in the vertical direction (direction of an elevation/depression angle) and the horizontal direction (direction of an azimuth angle), system characteristics are expected to be improved.

In 3GPP standardization, 3D-MIMO using transmission antennas up to eight is called "elevation beamforming", and 3D-MIMO using transmission antennas over 8 (e.g., 16, 32, 64, etc.) is often called "Full Dimension (FD) MIMO" or "Massive MIMO".

Massive MIMO technology can improve frequency use efficiency by creating steerable sharp beams using a large number of antenna elements at a base station.

List of Prior Art Documents

Document 1: "Study on Downlink Enhancement for Elevation Beamforming for LTE," 3GPP TSG RAN#58, RP-121994

Document 2: "New SID proposal: Study on Full Dimension for LTE," 3GPP TSG RAN#58, RP-122015

SUMMARY OF THE INVENTION

Technical Problem to be Solved

In light of reduction in size of antenna elements, Massive MIMO is assumed to be operated at a relatively high frequency band, up to several tens gigahertz (GHz). This is because the distance between antenna elements depends on wavelength.

When using a high frequency band, degradation in transmission characteristics becomes conspicuous due to increased propagation loss. To compensate for the degradation, the beam gain has to be increased using a large number of base station antennas. As the number of antennas increases, the antenna array size increases. There is a tradeoff between the number of antennas or beam gain and propagation loss.

For data signals, base stations can carry out beamforming based upon channel state information (CSI) fed back from user equipment (UE). In a time division duplex (TDD) system, base stations may perform beamforming by directly estimating channels based upon downlink-uplink duality.

However, at initial connection of user equipment with a Massive MIMO base station, the Massive MIMO base station does not know the optimum beam for this user equipment, and accordingly, sufficient coverage cannot be achieved. From the viewpoint of filling coverage holes, precoding is generally not performed on those signals transmitted to all or many users in the cell, such as synchronization signals, broadcast signals, or cell-specific reference signals (CRS).

It is desired to provide a technique for implementing appropriate beam detection, while securing cell coverage, even at initial connection to a 3D-MIMO base station.

Means for Solving the Problem

To solve the above-described technical problem, in one aspect of the invention, a radio communication system includes a first radio base station having multiple antenna elements, and a user equipment, wherein, for initial connection of the user equipment to the first radio base station, the first radio base station applies different precoding vectors to a downlink user common signal transmitted to all users located in or near a serving area of the first radio base station, and transmits the downlink user common signal while changing the applied precoding vector, wherein the user equipment selects a desired one of the precoding vectors applied to the downlink user common signal, and reports a selection result to the first radio base station, and wherein the first radio base station precodes a data signal addressed to the user equipment using the selected precoding vector and transmits the precoded data signal to the user equipment.

Advantageous Effect of the Invention

At initial connection to a 3D-MIMO base station, optimum beam detection is achieved, while securing cell coverage.

BRIEF DESCRIPTION OF THE DRAWINGS

FIG. 3 illustrates examples of transmission of a synchronization signal under switching between precoding vectors;

FIG. 4 illustrates examples of a two-dimensional antenna array provided to a Massive-MIMO base station;

EMBODIMENTS TO CARRY OUT THE INVENTION

In one example of the preferred embodiments, a 3D-MIMO base station is provided within the service area of a macro base station, and precoding is applied to those signals for which beamforming is typically not performed.

By performing three-dimensional beamforming on such signals in horizontal, vertical, or combined direction using a precoding technique, area coverage is enhanced.

Examples of signals for which beamforming is typically not performed include a synchronization signal, a broadcast channel, a cell-specific, reference signal (CRS), a discovery signal discussed in the 3GPP standardization Release 12, etc. Since these signals are transmitted to all users in the cell, these signals are referred to as "downlink user common signals" in this specification and claims.

To apply beamforming to a downlink user common signal to be transmitted to all users in the cell, a novel configuration is needed to enable the 3D-MIMO base station to detect the optimum beam for user equipment, even if the optimum beam for that user equipment is unknown to the 3D-MIMO base station during, for example, establishment of the initial connection to the user equipment.

To achieve this, the present invention proposes a scheme of (1) transmitting a downlink user common signal from the 3D-MIMO base station continuously, constantly, or intermittently, using different beamforming vectors; or
(2) detecting the optimum beam at the 3D-MIMO base station making use of uplink information transmitted from user equipment.

First Embodiment

Figure 1:
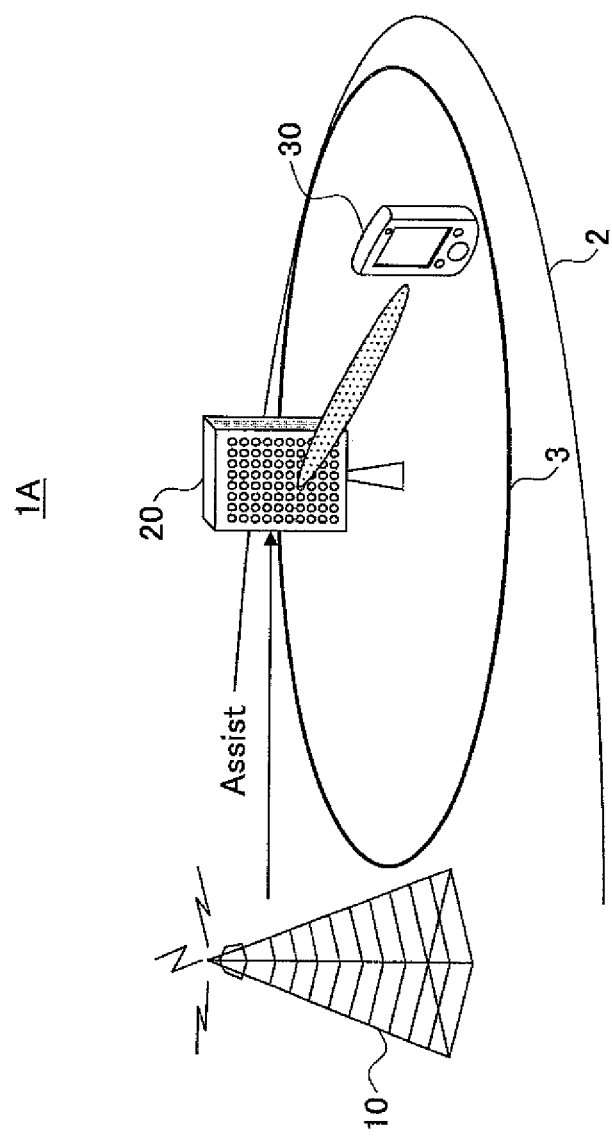
FIG. 1 is a schematic diagram of a radio communication system according to the first embodiment.

FIG. 1 is a schematic diagram of a radio communication system 1A to which the present invention is applied. The radio communication system 1A includes a macro base station (corresponding to the second radio base station in claims) 10, a 3D-MIMO base station 20 (corresponding to the first radio base station in claims), and a user equipment 30. The macro base station 10 covers an area 2, which area is broader than an area 3 of the 3D-MIMO base station 20. The 3D-MIMO base station 20 has a two-dimensional antenna array and is located within or in the vicinity of the area 2 of the macro base station 10. The number of antennas of the 3D-MIMO base station 20 is arbitrary, and it may be eight, greater than eight, or less than eight. In this example, the 3D-MIMO base station 20 has antennas greater than eight, and in this regard, the 3D-MIMO base station 20 may be referred to as a "Massive-MIMO base station 20." Although only a single Massive-MIMO base station 20 is depicted in the figure for the purpose of simplification, two or more Massive-MIMO base stations 20 may be provided within or near the area 2 of the macro base station 10.

The Massive MIMO base station 20 transmits signals with a highly directional beam shape in its own service area 3. The Massive MIMO base station 20 applies beamforming not only to data signals, but also downlink user common signals, such as synchronization signals, CRSs, or discovery signals, to which signals beamforming is typically not applied, to expand the coverage.

In the first embodiment, the Massive MIMO base station 20 finds the optimum beam for the user equipment 30 by transmitting a downlink user common signal using different beamforming vectors. In the following descriptions, a synchronization signal is transmitted as an example of the downlink user common signal.

Figure 2:
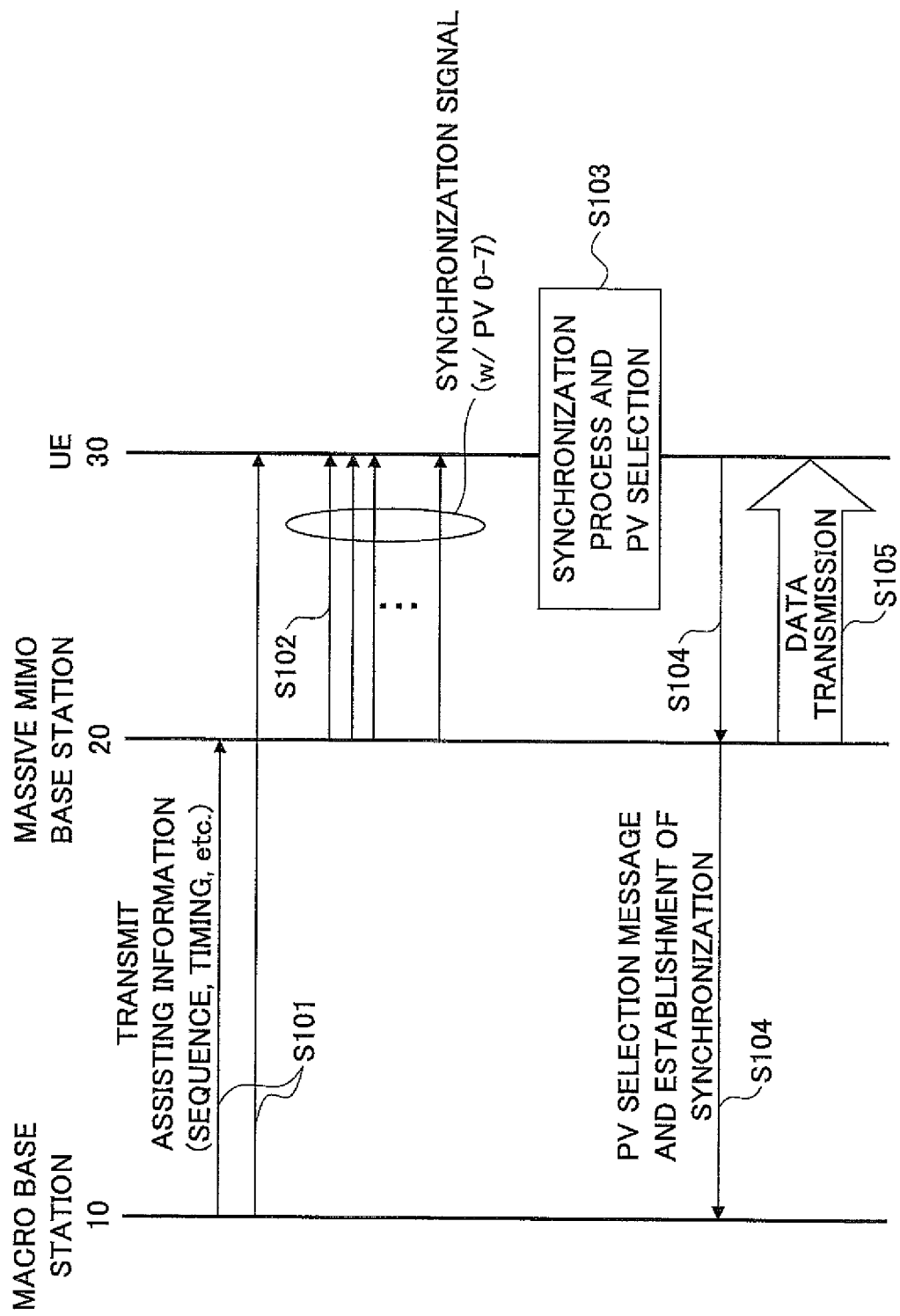
FIG. 2 is a sequence diagram of operations performed in the radio communication system of the first embodiment.

FIG. 2 is a sequence diagram illustrating the operations performed in the radio communication system 1A of FIG. 1. The macro base station 10 transmits assist information to the Massive MIMO base station 20 and the user equipment (UE) 30 (S101). The assist information may be transmitted from the macro base station 10 to the Massive MIMO base station 20 via wireless backhaul, fiber optic backhaul, or any other suitable medium.

The assist information includes a synchronization signal sequence, the multiplexing position of the synchronization signal in the time and frequency domains, the number of transmission antennas, beamforming information to be added to the synchronization signal sequence, etc., of the Massive MIMO base station 20 adjacent to the user equipment 30. Interference whitening may be performed on these information items by carrying out hopping based upon the frequency hopping pattern associated with the physical cell identification (PCID) or virtual cell identification (VOID) assigned to the Massive MIMO base station 20.

The Massive MIMO base station 20 transmits a synchronization signal in the serving area 3 based upon the assist information (S102). The synchronization signal may be transmitted from the Massive MIMO base station 20 continuously, intermittently, or periodically. Alternatively, the Massive MIMO base station 20 starts transmitting the synchronization signal upon receiving a trigger signal from the macro base station 10. Using the trigger signal from the macro base station 10, the frequency of transmitting the synchronization signal from the Massive MIMO base station 20 can be reduced.

The Massive MIMO base station 20 transmits the synchronization signal, while changing a precoding vector among plural vectors. In the example of FIG. 2, precoding vectors PV0 to PV7 are used to perform beamforming for the synchronization signal.

FIG. 3 illustrates example of switching between multiple precoding vectors during transmission of the synchronization signal. In part (A) of FIG. 3, the Massive MIMO base station 20 changes the precoding vector using multiple time slots, such as transmission time intervals (ITIs).

For example, at time t1, precoding vector PV0 is used to form a beam in the first direction. At time 2, preceding vector PV1 is used to form a beam in the second direction, and so forth. The synchronization signal is transmitted from t1 to t8 with different precoding vectors sequentially switched corresponding to the time slot.

In part (B) of FIG. 3, the Massive MIMO base station 20 changes the precoding vector on the carrier frequency basis. The carrier frequency based PV switching may be performed resource block by resource block, subband by subband, subcarrier by subcarrier, or any other suitable criteria. At frequency f1, precoding vector PV0 is used to transmit the synchronization vector in the first direction. At frequency f2, preceding vector PV1 is used to transmit the synchronization signal in the second direction, and so forth. The synchronization signal is transmitted from f1 to f8 with different precoding vectors sequentially switched corresponding to the carrier frequency.

In part (C) of FIG. 3, the Massive MIMO base station 20 divides antennas of the two-dimensional antenna array into multiple antenna groups, and changes the precoding vector on the antenna group basis. Orthogonal signal sequences may be assigned to the respective antenna groups to select the optimum beam.

The Massive MIMO base station 20 may multiplex two or more orthogonal synchronization signal sequences and transmit the multiplexed signals. Alternatively, the same synchronization signal may be transmitted over several time slots from the transmission antennas to allow the user equipment 30 to obtain time diversity gain. The precoding vector switching schemes illustrated in (A) and (C) of FIG.

3 may be combined, or the precoding vector switching schemes illustrated in (B) and (C) of FIG. 3 may be combined.

FIG. 4 illustrates examples of the antenna array 5 provided to the Massive MIMO base station 20. In configuration (A) of FIG. 4, multiple antenna elements form a single antenna. Each of the cross marks represents an orthogonally polarized antenna element. If four antenna elements form one antenna for one polarized wave, four cross marks form two antennas. The antenna array 5 of configuration (A) forms a total of 64 antennas (2×16×2=64) with 2 lines, 16 columns, and 2 polarizations.

In configuration (B) of FIG. 4, a single element corresponds to one antenna. In this example, the antenna array 5 has 64 antennas (8×8=64).

In configuration (C) of FIG. 4, orthogonally polarized antenna elements are used. Each cross mark deals with two polarization directions, and 128 antennas (8×8×2) are provided.

In configuration (D) of FIG. 4, a single polarization element is used. In this case, 64 antennas (8×8) are provided. The antenna array 5 has an arbitrary arrangement of antenna elements, other than the examples illustrated in FIG. 4. The switching of the preceding vectors in FIG. 3(C) may be implemented by grouping the antennas of the antenna array of FIG. 4 or other array structures into multiple groups and conducting beamforming at the respective groups using different precoding vectors.

Returning to FIG. 2, the user equipment 30 located in the area 3 of the Massive MIMO base station 20 receives a synchronization signal from the Massive MIMO base station 20. Upon the reception of the synchronization signal, the user equipment 30 carries out a synchronization process and selects a preceding vector (S103). With the precoding vector switching scheme (A) of FIG. 3, the user equipment 30 receives the synchronization signal over time duration t1 to t8 and selects the optimum beam (i.e., the optimum preceding vector). The selection of the optimum beam may be achieved by determining correlation between the received signal and a replica signal held in advance in the user equipment 30. As an alternative, the user equipment 30 may receive the synchronization signal starting from t1 and select a beam at a point of time when the correlation value exceeds a prescribed threshold value. For example, if the correlation value of the synchronization signal received at time t3 exceeds the threshold value, the user equipment 30 selects the beam (or the preceding vector) of index 3 as the optimum beam.

With the preceding vector switching scheme (B) of FIG. 3, the user equipment 30 receives the synchronization signal at carrier frequencies f1 through f8, and selects the beam (or the precoding vector) at the optimum frequency component. As an alternative, the user equipment 30 may scan the carrier frequencies starting from f1, and select the beam at the carrier frequency at which the correlation value exceeds the threshold value.

With the preceding vector switching scheme (C) of FIG. 3, the user equipment 30 receives the synchronization signals from the antenna groups 1 through 8 and selects the optimum beam (or the precoding vector) transmitted from the optimum antenna group. As an alternative, the user equipment 30 may receive the synchronization signals transmitted in turn starting from the antenna group 1, and select the beam upon the correlation value having exceeded the threshold value.

Then, the user equipment 30 reports the selection of the precoding vector to the Massive MIMO base station 20 or the macro base station 10, as a part of the process of completion of synchronization (S104). The selected beam may be identified by simply reporting the beam forming index. From this feedback information, the Massive MIMO base station 20 can know the optimum beam for the user equipment 30.

Herewith, downlink synchronization has been established and the Massive MIMO base station 20 starts data transmission to the user equipment 30 (S105). Although not illustrated in the figure, if the message reporting completion of synchronization and selection of the beam is transmitted from the user equipment 30 to the macro base station 10, the macro base station 10 may transmits a control signal to the Massive MIMO base station 20. The Massive MIMO base station 20 may start data transmission to the user equipment 30 based upon the control signal.

The same process applies when cell detection is performed using a cell-specific reference signal (CRS) in place of the synchronization signal. The user equipment 30 receives the CRS transmitted from the Massive MIMO base station 20 using different beamforming vectors on the timeslot basis (e.g., t1 to t8), the carrier frequency basis (e.g., f1 to f8), or the antenna group basis (e.g., group 1 to group 8). The user equipment 30 selects and reports the optimum beam index to the Massive MIMO base station 20 or the macro base station 10.

The assist information transmitted from the macro base station 10 may include information items about two or more Massive MIMO base stations 20. In this case, the user equipment 30 carries out a synchronization process with respect to the plural Massive MIMO base stations 20, and selection of Massive MIMO base stations (i.e., cell detection) can be performed at high accuracy. To perform cell detection based upon CRS, the assist information may include the signal sequence or the multiplexing position of the CRS.

Although using the assist information from the macro base station 10 is an effective strategy, the assist information is not always essential. Only the Massive MIMO base station 20 and the user equipment 30 may be involved in the detection of the optimum beam. For example, the Massive MIMO base station 20 keeps on transmitting a downlink user common signal such as a synchronization signal while changing time slot, carrier frequency, or antenna group responsive to prescribed precoding vectors (e.g., PV0 to PV7). The user equipment 30 reports the precoding vector used at the point where the synchronization or correlation has been established to the Massive MIMO base station 20. This arrangement can also achieve enhanced cell coverage and optimum beam detection.

The assist information from the macro base station is effective, but it is not indispensable. The Massive MIMO base station 20 and the user equipment 30 may operate by themselves.

Second Embodiment

Next, explanation is made of a radio communication system and cell detection according to the second embodiment. In the second embodiment, a Massive MIMO base station 20 to which the user equipment 30 is to be connected and the optimum downlink precoding vector are selected making use of an uplink signal from the user equipment 30 to Massive MIMO base stations 20.

Figure 5:
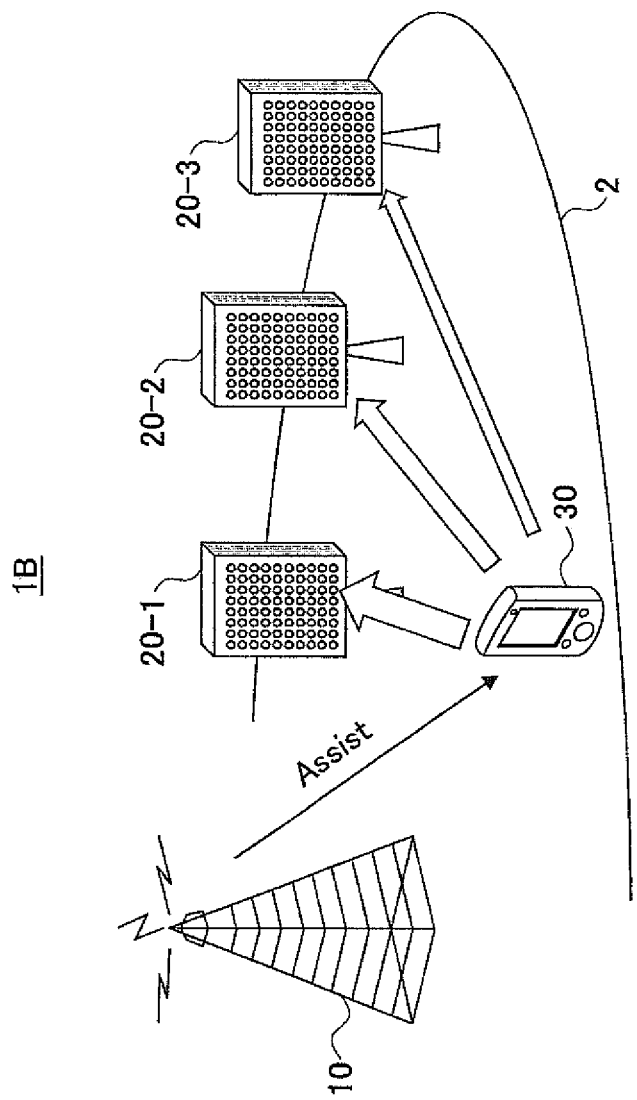
FIG. 5 is a schematic diagram of a radio communication system according to the second embodiment.

FIG. 5 is a schematic diagram of a radio communication system 1B according to the second embodiment. The radio communication system 1B includes a macro base station 10, Massive MIMO base stations 20-1, 20-2, and 20-3 provided in the serving area 2 of the macro base station 10, and user equipment 30. The user equipment 30 transmits an uplink signal to the Massive MIMO base stations 20-1, 20-2, and 20-3 based upon assist information transmitted from the macro base station 10.

Figure 6:
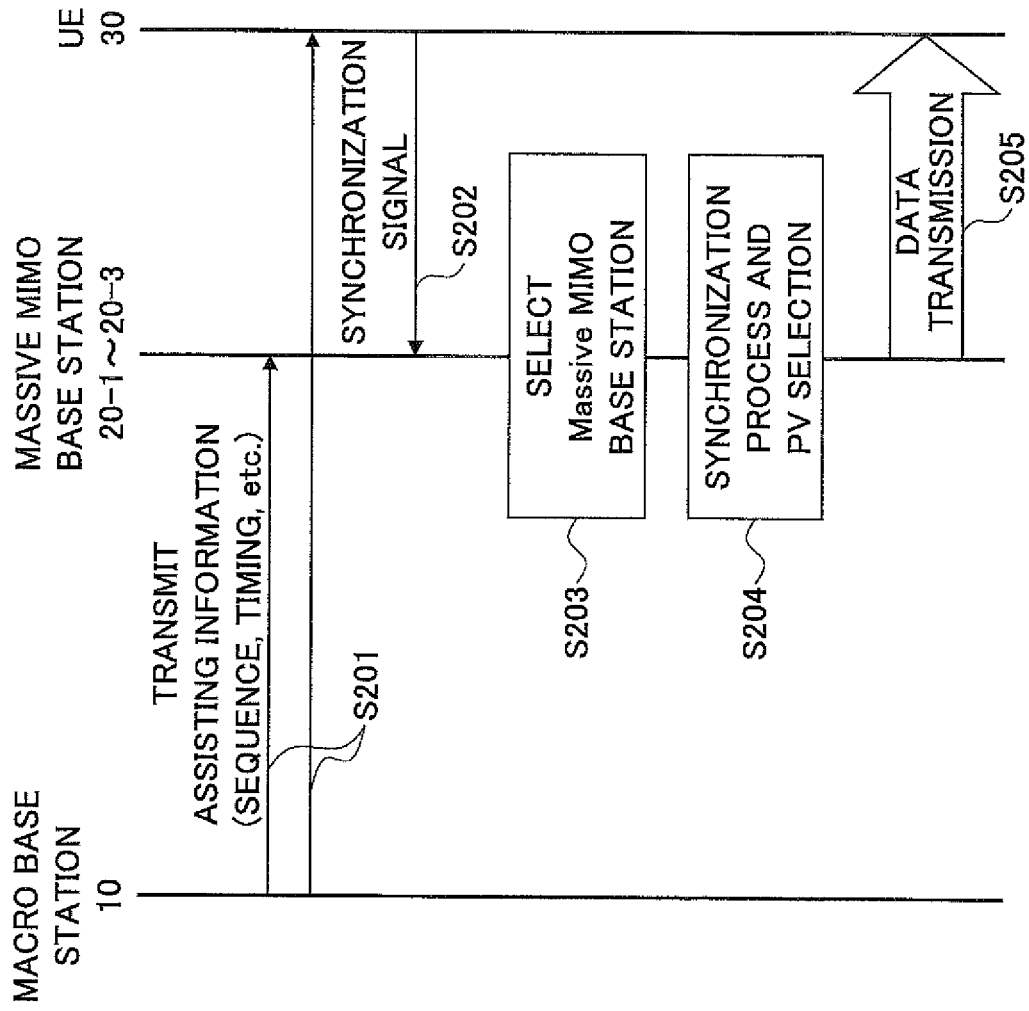
FIG. 6 is a sequence diagram of operations performed in the radio communication system of the second embodiment.

FIG. 6 is a sequence diagram of the operations performed in the radio communication system 1B of FIG. 5. First, the macro base station 10 transmits assist information to the Massive MIMO base stations 20-1 to 20-3 and the user equipment 30 located in the serving area 2 (S201). The assist information may include synchronization signal sequences, the multiplexing positions of the synchronization signals in the time and frequency domains, the numbers of transmission antennas, uplink signal transmission timing, beamforming information to be added to the synchronization signal sequences, etc., of the Massive MIMO base stations 20-1, 20-2, and 20-3.

The user equipment 30 transmits an uplink signal to the Massive MIMO base stations 20-1, 20-2, and 20-3 (S202). The uplink signal may be a reference signal such as a demodulation reference signal (DM-RS) or a sounding reference signal (SRS), or a known reference signal or a physical channel, such as a random access channel (RACH) already standardized in LTE. Alternatively, the uplink signal may be a newly defined uplink signal. The uplink signal may be multiplexed on a physical uplink shared channel (PUSCH).

The Massive MIMO base stations 20-1 through 20-3 receive the uplink signal from the user equipment 30 at an uplink transmission timing, and the optimum Massive MIMO base station 20 is selected based upon, for example, the intensity of the received radio wave (S203). The selection of the optimum Massive MIMO base station 20 may be done by the macro base station 10 based upon the intensity information supplied from the respective Massive MIMO base stations 20-1 through 20-3, or by coordinated operations among the Massive MIMO base stations 20-1 through 20-3.

When the uplink signal is a synchronization signal, the selected Massive MIMO base station 20 carries out a synchronization process. The selected Massive MIMO base station 20 also estimates a direction of arrival (DOA) from the uplink signal received at multiple receiving antennas and choses a downlink precoding vector (S204).

The selected Massive MIMO base station 20 generates the precoding vector (or weight) and transmits a data signal to the user equipment 30 on the prescribed beam.

Since the number of antenna elements provided to the user equipment 30 is limited, it cannot be expected much to obtain a sharp beamforming gain, unlike a downlink signal. To overcome this, the user equipment 30 may transmit a synchronization signal (or any suitable reference signal) several times over a certain time frame to obtain time diversity effect.

Although use of the assist information transmitted from the macro base station 10 is effective, it is not indispensable in the second embodiment to user the assist information. Only the massive MIMO base stations 20 and the user equipment 30 may be involved to detect the optimum beam.

<Configuration of Apparatus>

Figure 7:
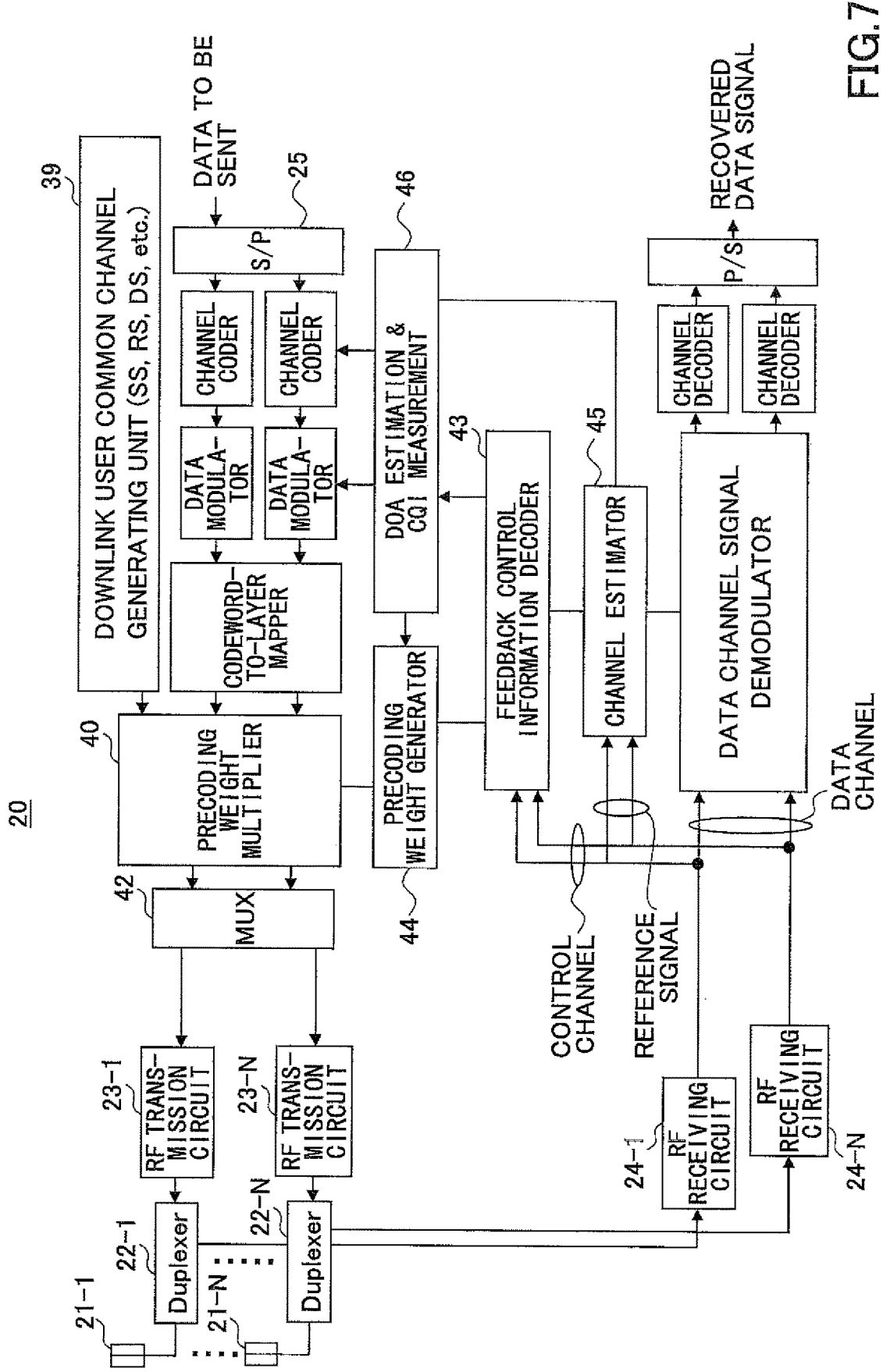
FIG. 7 illustrates an exemplified structure of the Massive MIMO base station.

FIG. 7 is a schematic diagram of the Massive MIMO base station 20 used in the first and second embodiments. The Massive MIMO base station 20 has multiple antennas 21-1 to 21-N. Radio frequency (RF) transmission circuits 23-1 to 23-N and RF receiving circuits 24-1 to 24-N are provided according to the respective antennas 21-1 to 21-N. Although not illustrated in FIG. 7, the Massive MIMO base station 20 may have a backhaul communication circuit for communication with the macro base station 10 via a backhaul link.

A downlink user common channel generating unit 39 generates a downlink user common signal broadcast to all users in the cell. The downlink user common signal is, for example, a synchronization signal, a reference signal, a discovery signal, or any other signal transmitted in common to all users. A precoding weight generator 44 generates preceding weights (or vectors) for transmitting the downlink user common signal on beams with different directivities. The generated precoding weight represents, for example, amount of phase rotation in the horizontal direction, amount of phase rotation in the vertical direction, and amount of phase rotation between the polarizations.

A precoding weight multiplier 40 performs linear processing on the signal sequence of the downlink user common signal while changing a precoding vector among those generated by a preceding weight generator 44 on a time basis, a frequency basis, or an antenna group basis. The linearly processed downlink user common signal is converted to a radio frequency signal at the RF transmission circuits 23-1 to 23-N, and transmitted from the transmission antennas 21-1 to 21-N, via the duplexers 22-1 to 22-N, in a desired direction with a desired beam shape.

The RF receiving circuits 24-1 to 24-N receive uplink signal via the antennas 21-1 to 21-N and the duplexers 22-1 to 22-N. If the received signal is feedback control information such as a precoding vector selection result (e.g., a beam index) from the user equipment 30, the feedback control information is supplied to a channel estimator 45 and a feedback control information demodulator 43. The demodulation result is supplied to the preceding weight generator 44. The precoding weight multiplier 40 precodes a data signal to be sent to the user equipment 30 using the selected beam (i.e., the preceding vector).

If the received signal is an uplink reference signal from the user equipment 30, a DOA estimation and CQI measurement unit 46 estimates a direction of arrival from the received signal, and supplies the estimation result to the precoding weight generator 44. The preceding weight generator 44 selects a precoding vector for a downlink signal based upon the estimated direction of arrival.

A data signal to be sent to the user equipment 30 having established initial connection is input to the precoding weight multiplier 40, via a serial-to-parallel converter 25, channel coders, data modulators, and a codeword-to-layer mapper. The preceding weight multiplier 40 performs the optimum preceding on the data signal. If a reference signal is scattered in the data signal, the precoded data signal and the reference signal are multiplexed by a multiplexer 42, and transmitted from the antennas 21-1 to 21-N using a beam defined by the selected precoding vector.

Estimation of signal reception timing, removal of a cyclic prefix (CP), fast Fourier transform (FFT), or inverse discrete Fourier transform (IDFT) in the receiving block, and inverse fast Fourier transform (IFFT) or CP adding in the transmission block do not directly relate to the invention. Accordingly, illustration and explanation for these components are omitted.

Figure 8:
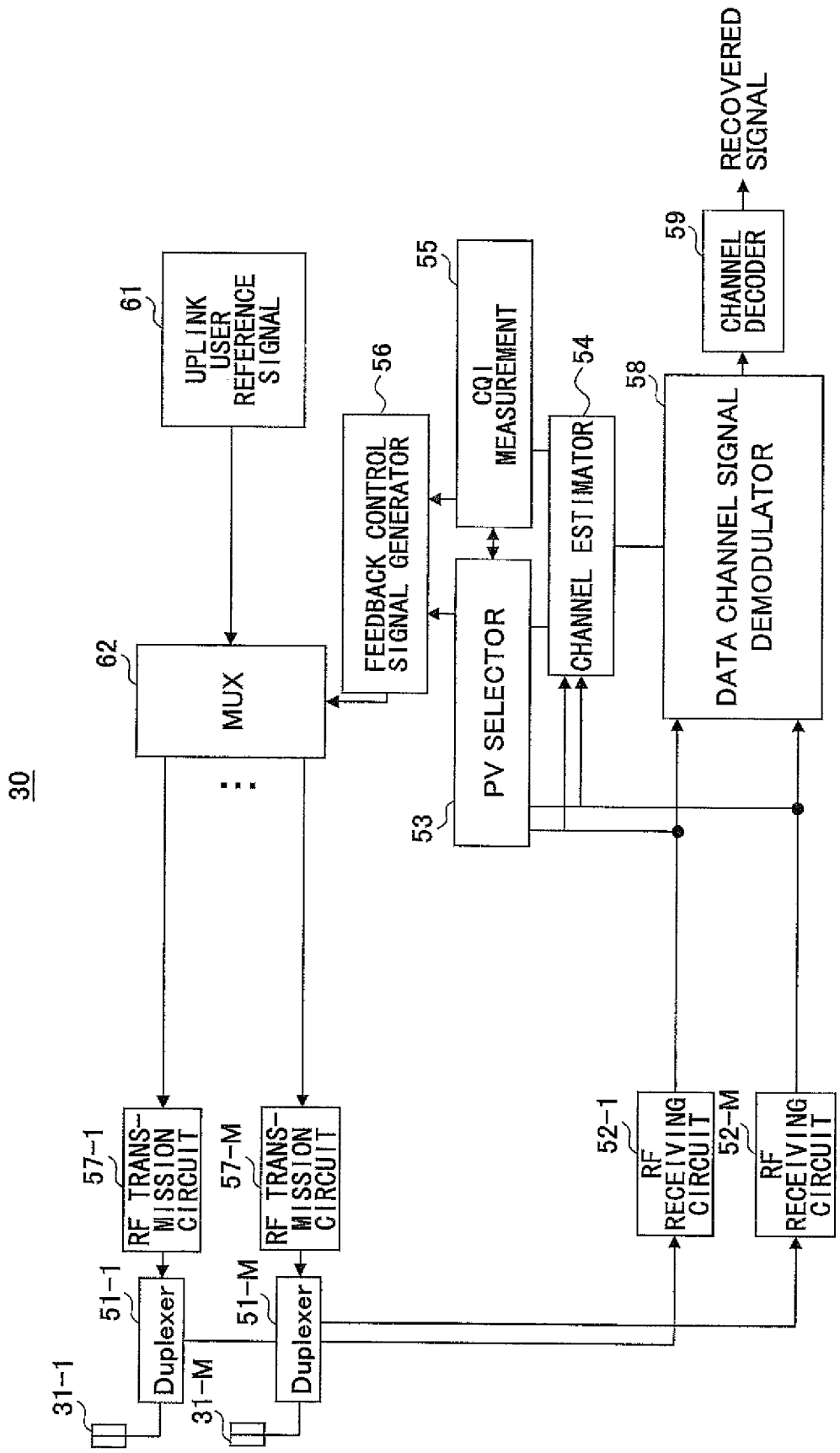
FIG. 8 illustrates an exemplified structure of the user equipment.

FIG. 8 is a schematic block diagram of user equipment 30. RF receiving circuits 52-1 to 52-M receive a downlink user common signal linearly processed using different precoding vectors PV0 to PV7 via antennas 31-1 to 31-M and duplexers 51-1 to 51-M. The RF receiving circuits 52-1 to 52-M receive the downlink user common signal over time t1 to t8, or at frequencies f1 to f8, or corresponding to antenna groups 1 to 8, for example.

If the downlink user common signal is a synchronization signal, a precoding vector (PV) selector 53 selects a beam that has the highest correlation between the received synchronization signal sequence and the synchronization signal sequence contained in the assist information from the macro base station 10. Alternatively, a beam whose correlation has first exceed a predetermined threshold may be selected. If the downlink user common signal is a reference signal, the same process is performed. The optimum beam (i.e., the optimum precoding vector) is selected based upon the comparison between the received reference signal sequence and the reference signal sequence contained in the assist information, or based upon comparison with a predetermined threshold level.

A feedback control signal generator 56 creates feedback control information for reporting the precoding vector (or the beam index) selected by the precoding vector selector 53. The feedback control information is supplied to the RF transmission circuits 57-1 to 57-M and transmitted via the duplexers 51-1 to 51-M from antennas 31-1 to 31-M, toward the Massive MIMO base station(s) 20 or the macro base station 10.

An uplink user reference signal generator 61 generates a user reference signal including a synchronization signal, a reference signal, or a random access (RACH) signal used for initial connection to the Massive MINO base station 20. The user reference signal may be multiplexed on a physical uplink shared channel by a multiplexer 62.

RF receiving circuits 52-1 to 52-N receive a downlink data signal from the Massive MIMO base station 20. This data signal has been transmitted using the optimum beam (or the preceding vector) selected by the Massive MIMO base station 20 based on the feedback control signal or the uplink user reference signal. The data signal is demodulated by a data.channel signal demodulator 58 based upon a channel estimation result supplied from a channel estimator 54, and decoded by a channel decoder 59.

With the above-described structure and process, the optimum beam can be detected efficiently while enhancing the coverage of the Massive MIMO base station even at initial connection from the user equipment 30.

In the foregoing, the first scheme in that the Massive MIMO base station 20 uses assist information from the macro base station 10 (the first embodiment) and the second scheme in which the Massive MIMO base station 20 uses an uplink signal from the user equipment 30 (the second embodiment) have been described. These two schemes may be combined. For example, after a cell (i.e., a Massive MIMO base station) is selected using the uplink signal from the user equipment 20, the selected Massive MIMO base station 20 may perform beamforming using different preceding vectors (PV0 to PV7).

The present invention is not limited to beamforming for a synchronization signal (including a primary synchronization signal (PSS) or a secondary synchronization signal (SCC)), a reference signal such as CRS, or a discovery signal. The invention is applicable to an arbitrary downlink user common signal for which beamforming is generally not performed.

The present invention is applicable not only to initial connection, but also to handover or cell reselection. Power control (or amplitude control) may be performed in combination with beam forming.

This patent application is based upon and claims the benefit of the priority of the Japanese Patent Application No. 2013-074455 filed Mar. 29, 2013, which is incorporated herein by references in its entirety.

The invention claimed is:

1. A radio base station comprising:
a transmitter that continuously transmits to a terminal, a downlink user common signal by applying different precodings corresponding to multiple time slots, the downlink user common signal including a synchronization signal and a broadcast channel on a physical broadcast channel; and
a receiver that receives a selection result of a precoding selected by the terminal from among the different precodings.

2. The radio base station according to claim 1, wherein the different precodings are applied to the downlink user common signal on a time basis.

3. The radio base station according to claim 1, wherein the downlink user common signal differs in precoding and corresponding time slot between the terminal and another terminal.

4. The radio base station according to claim 1, wherein the synchronization signal is transmitted sequentially with the different precodings corresponding to the multiple time slots.

5. A terminal comprising:
a receiver that continuously receives a downlink user common signal to which different precodings are applied corresponding to multiple time slots, the downlink user common signal includes a synchronization signal and a broadcast channel on a physical broadcast channel; and
a transmitter that selects a desired precoding from among the different precodings applied to the downlink user common signal and transmits a selection result.

6. The terminal according to claim 5, wherein the downlink user common signal differs in precoding and corresponding time slot between the terminal and another terminal.

7. The terminal according to claim 5, wherein the synchronization signal is received sequentially with the different precodings corresponding to the multiple time slots.

* * * * *